(12) United States Patent
Drzymala et al.

(10) Patent No.: US 8,740,075 B2
(45) Date of Patent: Jun. 3, 2014

(54) APPARATUS FOR AND METHOD OF READING TARGETS ARBITRARILY ORIENTED IN IMAGING WORKSTATIONS

(75) Inventors: Mark Drzymala, St. James, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 223 days.

(21) Appl. No.: 13/267,323

(22) Filed: Oct. 6, 2011

(65) Prior Publication Data

US 2013/0087617 A1    Apr. 11, 2013

(51) Int. Cl.
*G06K 7/10*    (2006.01)

(52) U.S. Cl.
USPC ..................... 235/454; 235/426.11

(58) Field of Classification Search
USPC .................. 235/454, 462, 467, 383
See application file for complete search history.

(56) References Cited

U.S. PATENT DOCUMENTS

| | | | | |
|---|---|---|---|---|
| 5,886,336 | A * | 3/1999 | Tang et al. | 235/462.43 |
| 6,237,852 | B1 * | 5/2001 | Svetal et al. | 235/462.43 |
| 6,491,224 | B2 * | 12/2002 | Ohkawa et al. | 235/462.4 |
| 2006/0022051 | A1 | 2/2006 | Patel et al. | |
| 2009/0078775 | A1 | 3/2009 | Giebel et al. | |
| 2010/0163622 | A1 | 7/2010 | Olmstead | |
| 2010/0163626 | A1 | 7/2010 | Olmstead | |
| 2010/0163628 | A1 | 7/2010 | Olmstead | |

FOREIGN PATENT DOCUMENTS

| | | |
|---|---|---|
| WO | 2009102616 A2 | 8/2009 |
| WO | 2010075581 A2 | 7/2010 |

OTHER PUBLICATIONS

International Search Report and Written Opinion for International Patent Application No. PCT/US2012/058449 mailed Feb. 22, 2013.

\* cited by examiner

*Primary Examiner* — Daniel St. Cyr
(74) *Attorney, Agent, or Firm* — Nong-Qiang Fan

(57) ABSTRACT

An apparatus for and method of electro-optically reading targets arbitrarily oriented in a workstation, such as a dual window workstation, employs a solid-state imager for capturing return light from the targets over a field of view. The imager has an array of sensors arranged along mutually perpendicular array axes. An optical system splits the field of view into a plurality of subfields of view that extend through a workstation window to a target. One subfield is optically configured to enable the imager to capture light from the target along one array axis. Another subfield is optically configured to enable the imager to capture light from the target along the other array axis. A controller processes the captured light in both the one and the other subfields to enable the reading of the arbitrarily oriented target in the workstation independently of target orientation relative to the array axes.

17 Claims, 18 Drawing Sheets

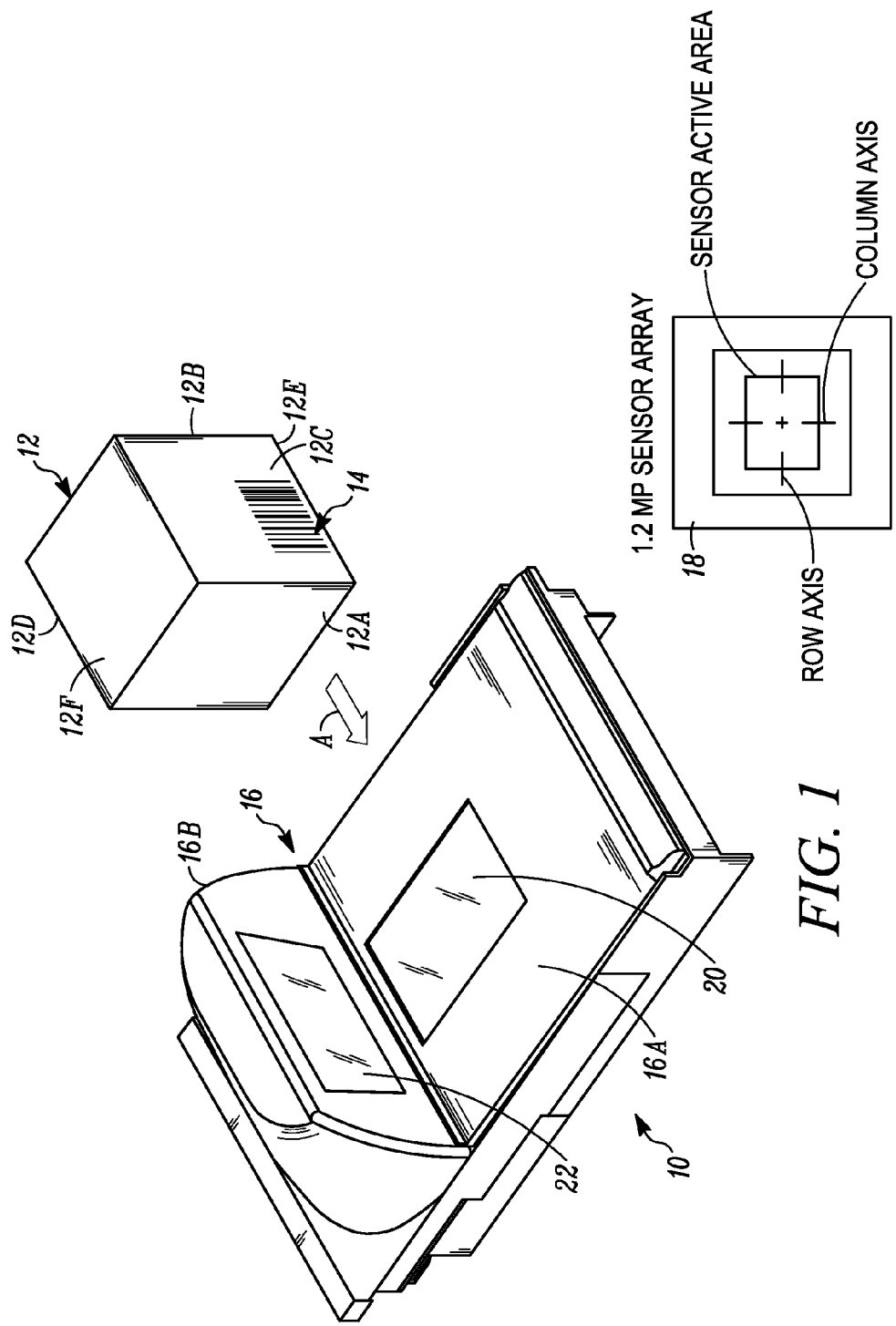

APPARATUS FOR AND METHOD OF READING TARGETS ARBITRARILY ORIENTED IN IMAGING WORKSTATIONS

FIELD OF THE DISCLOSURE

The present disclosure relates generally to an apparatus for, and a method of, electro-optically reading targets by image capture at a workstation and, more particularly, to reading targets arbitrarily oriented in the imaging workstation.

BACKGROUND

Solid-state imaging workstations, that are configured either as vertical slot scanners each having a generally vertically arranged, upright window, or as flat-bed or horizontal slot scanners each having a generally horizontally arranged window, or as bi-optical, dual window scanners each having both generally horizontally and vertically arranged windows, or as stand-mounted, stationary scanners each having a presentation window, have been installed in many venues, such as supermarkets, department stores, and other kinds of retailers, as well as warehouses, and other kinds of industrial settings, for many years, to electro-optically read by image capture a plurality of symbol targets, such as one-dimensional symbols, particularly Universal Product Code (UPC) bar code symbols, and two-dimensional symbols, as well as non-symbol targets, such as driver's licenses, receipts, signatures, etc., the targets being associated with, or borne by, objects or products to be processed by the workstations. An operator or a customer may slide or swipe a product associated with, or bearing, a target in a moving direction across and past a respective window of the workstation in a swipe mode. Alternatively, the operator or the customer may momentarily present the target associated with, or borne by, the product to an approximate central region of the respective window, and steadily momentarily hold the target in front of the respective window, in a presentation mode. The choice depends on user preference, or on the layout of the workstation, or on the type of the target.

The symbol target may be located low or high, or right to left, on the product, or anywhere in between, on any of six sides of the product. The symbol target may be oriented in a "fence" orientation in which elongated parallel bars of the UPC symbol are vertical, or in a "ladder" orientation in which the UPC symbol bars are horizontal, or at any tilted orientation angle in between the fence and ladder orientations. The products may be held by the user at various tilt angles during their movement across, or presentation to, either window of the bi-optical workstation. The products may be positioned either in contact with, or held at a distance away from, either window during such movement or presentation. All these factors make the symbol location variable and difficult to predict in advance.

Known imaging workstations typically include multiple, solid-state imagers, each comprising an array of pixels or sensors arranged along mutually perpendicular array axes, for sensing return light returning through at least one window of the workstation from a target being imaged. Each imager may be a two-dimensional charge coupled device (CCD) or a complementary metal oxide semiconductor (CMOS) device, operable at a frame rate, and is analogous to the image sensors used in electronic digital cameras. The known imaging workstations also typically include an illuminating light system for illuminating the target with illumination light from an illumination light source, e.g., one or more light emitting diodes (LEDs), through each window of the workstation; an imaging lens assembly, e.g., one or more imaging lenses, for capturing return ambient and/or illumination light scattered and/or reflected from the target through each window of the workstation over a main field of view and over a range of working distances relative to each window; and electrical circuitry for producing electronic analog signals corresponding to the intensity of the light captured by the image sensor over the main field of view, and for digitizing the analog signal. The electrical circuitry typically includes a controller or programmed microprocessor for controlling operation of the electrical components supported by the workstations, and for processing each target and/or decoding the digitized signal based upon a specific symbology when the target is a symbol.

To enable reliable reading of targets that could be positioned anywhere on all six sides of a three-dimensional product, some known imaging bi-optical workstations require about ten to twelve, or at least six, of such imagers in order to provide a full coverage scan zone that extends above the horizontal window and in front of the upright window so that the scan zone extends down as close as possible to the countertop, and sufficiently high above the countertop, and as wide as possible across the width of the countertop. The scan zone projects into space away from the windows and grows in volume rapidly in order to cover targets on products that are positioned not only on the windows, but also many inches therefrom. The scan zone must be large enough to read targets positioned in any possible way across the entire volume of the scan zone and must not have any dead areas in which targets are not covered and, therefore, cannot be read.

To bring the cost of the known imaging workstations down to an acceptable level, it is known to reduce the need for so many imagers down, for example, to two imagers, or even one imager, by splitting the main field of view of at least one of the imagers into a plurality of subfields of view, each additional subfield serving to replace an additional imager. The subfields diverge as they pass through the windows, thereby reducing resolution when imaging targets that are approximately parallel to the windows (a common situation), because the projection of individual sensors on the targets is also enlarged. If a target is being imaged by an outer subfield angled to the right or left of the workstation, then the projection of the sensors on the target is stretched to the right or left. If the target is being imaged through one window by a central subfield directed towards the opposite window, then the sensor projection is stretched at right angles to the stretch from the outer subfields. In other words, for each window, there are subfields that have a higher resolution along a horizontal (left/right or right/left) axis, and different subfields have a higher resolution along a vertical (up/down or down/up) axis.

Anamorphic optics have been proposed for use in the imaging lens assembly of each imager to change the size of the main field of view of each imager not only to fit the main field of view through each window, but also to optimize the resolution of each main field of view along both of the two mutually perpendicular array axes, thereby enabling reading of a symbol target in a single main field of view, no matter whether the symbol target is in the ladder orientation, or the fence orientation, or in another tilted orientation inclined between the ladder and fence orientations. In other words, each main field of view was optically configured and optimized along two mutually perpendicular directions to read the symbol target regardless of target orientation.

Anamorphic optics, however, require optical alignment and increase the cost of the workstation and decrease manufacturing efficiency. Even so, anamorphic optics are not readily usable in workstations where the main field of view is split into subfields, because the anamorphic optics would optically modify all the subfields from a single imager in the same way, and there would be no individual control over changing the size and resolution of each subfield. In other words, one of the subfields might be optimized to read the symbol target regardless of target orientation along one direction, but the other subfields would not be so optimized, and, as a result, the scan zone would have the aforementioned dead areas.

Accordingly, there is a need for an apparatus for, and a method of, reading targets in an imaging workstation where the main field of view is split into subfields to reduce the number of imagers required, and to reliably read such targets despite being arbitrarily oriented in the imaging workstation, without using anamorphic optics.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 is a perspective view of a dual window, bi-optical, point-of-transaction workstation or apparatus operative for reading arbitrarily oriented targets on multi-sided products passing through the workstation by image capture in accordance with this invention;

FIG. 2 is a top plan view of a sensor array of an imager for use in the workstation of FIG. 1;

Figure 3:
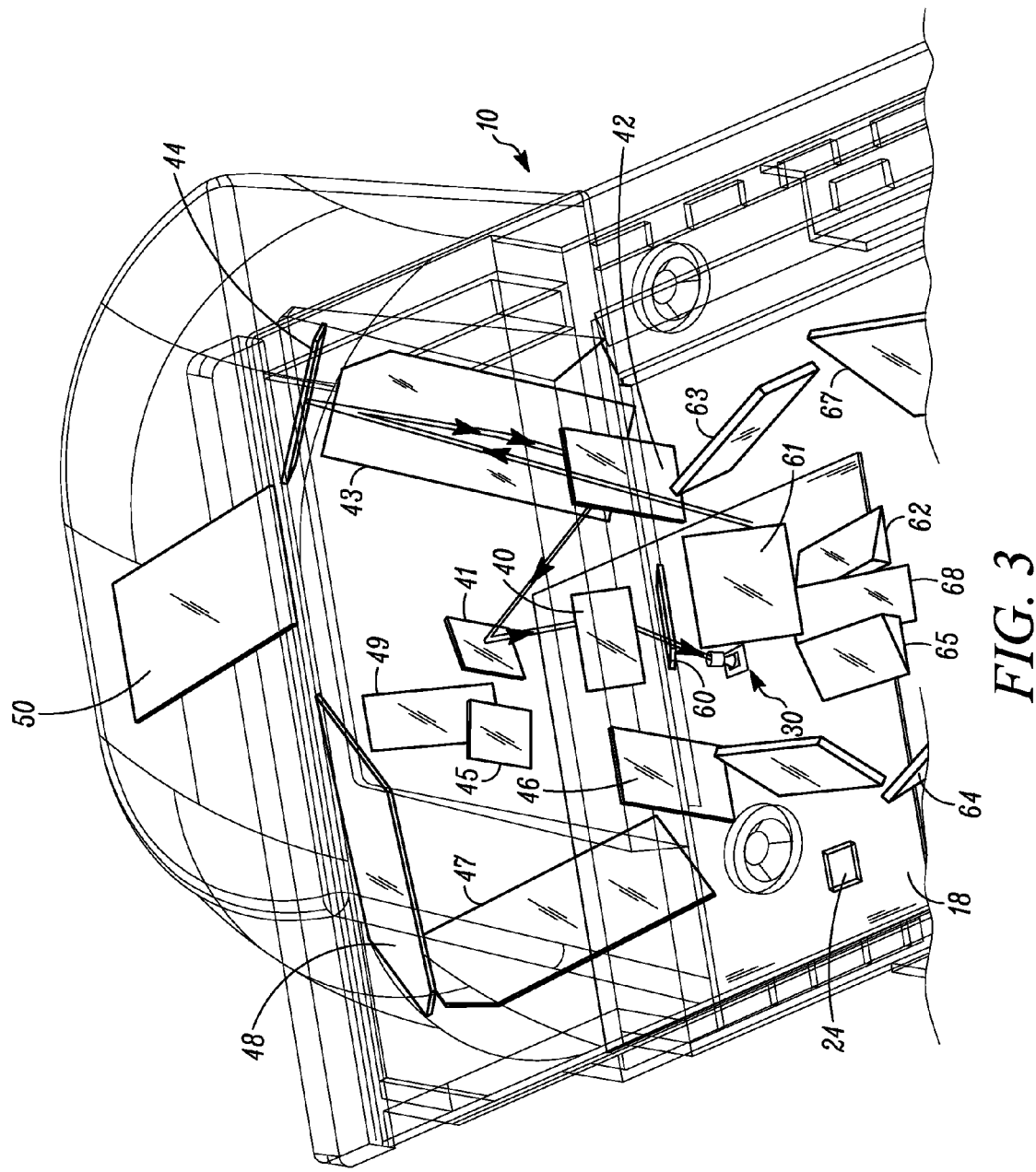
FIG. 3 is a broken-away, enlarged, perspective view of part of an optical system in the workstation of FIG. 1 diagrammatically depicting a folded optical path of an outer subfield of view of the imager of FIG. 2 for exit through an upright window.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus, in accordance with one feature of this invention, is a point-of-transaction workstation for electro-optically reading targets arbitrarily oriented in the workstation during reading. The workstation includes a housing, a window supported by the housing, and a solid-state imager supported by the housing, and operative for capturing return light from the targets over a field of view. The imager has an array of sensors arranged along mutually perpendicular array axes. An optical system is supported by the housing and is operative for splitting the field of view into a plurality of subfields of view that extend through the window to an arbitrarily oriented target in the workstation. The optical system optically configures one of the subfields, preferably with an optimal resolution, to enable the imager to capture return light from the arbitrarily oriented target along one of the array axes. The optical system also optically configures another of the subfields, preferably with a different resolution, to enable the imager to capture return light from the arbitrarily oriented target along the other of the array axes. A controller controls the imager and processes the captured return light in both the one and the other subfields to enable the reading of the arbitrarily oriented target in the workstation independently of target orientation relative to the array axes.

Thus, two subfields can be used to capture light from each target. If the target is oriented in one orientation, e.g., the above-described ladder orientation, then the subfield optimized to read a target in that orientation is used. If the target is oriented in another orientation, e.g., the above-described fence orientation, then the subfield optimized to read a target in that other orientation is used. If the target is oriented in the above-described tilted orientation, then both subfields can be used. Thus, either or both of these two subfields can be used to capture light from the target. Anamorphic optics are not employed. Subfields split from an imager can be employed.

FIG. 1 depicts a dual window, bi-optical, point-of-transaction workstation 10 for electro-optically imaging indicia 14 or targets, such as the illustrated UPC symbol described above, associated with multi-sided, three-dimensional products 12, and is typically used by retailers to process transactions involving the purchase of the products 12 bearing, or printed with, the identifying indicia 14. The workstation 10 includes a housing 16 having a generally horizontal window 20 located in a generally horizontal plane and supported by a horizontal housing portion 16A, and an upright window 22 located in a generally upright plane that intersects the generally horizontal plane and supported by a raised housing portion 16B. The upright plane may lie in a vertical plane, or be slightly rearwardly or forwardly inclined relative to the vertical plane. The upright window 22 is preferably recessed within its housing portion 16B to resist scratching. By way of numerical example, the generally horizontal window 20 generally measures about four inches in width by about six inches in length, while the generally upright window 22 generally measures about six inches in width by about eight inches in length. The products are passed by an operator or a customer through a scan zone, which occupies the space at and above the horizontal window 20, and also occupies the space at and in front of the upright window 22.

The indicia 14 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The indicia 14 could also be a non-symbol target, such as a personal check, a credit card, a debit card, a signature, a driver's license, the consumer himself or herself, or the operator himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products. Capturing an image of the operator is used for video surveillance for security purposes. Thus, it can be determined if the operator is actually scanning the products, or passing them around the windows in an effort to bypass the windows and not charge the customer in a criminal practice known in retailing as "sweethearting".

The product 12 need not be a three-dimensional box as illustrated, but can be any object having a left side 12A, a right side 12B, a front side 12C, a rear side 12D, a bottom side 12E, and a top side 12F. The product 12 is slid or moved by an operator or a customer across and past the windows 20, 22 in the direction of the arrow A through the scan zone, or is presented to a central region of either window. As described above, the product 12 can be tilted or moved in other directions through the workstation 10, and the indicia 14 can be oriented in the illustrated fence orientation, or in the above-described ladder and tilted orientations.

Figure 4:
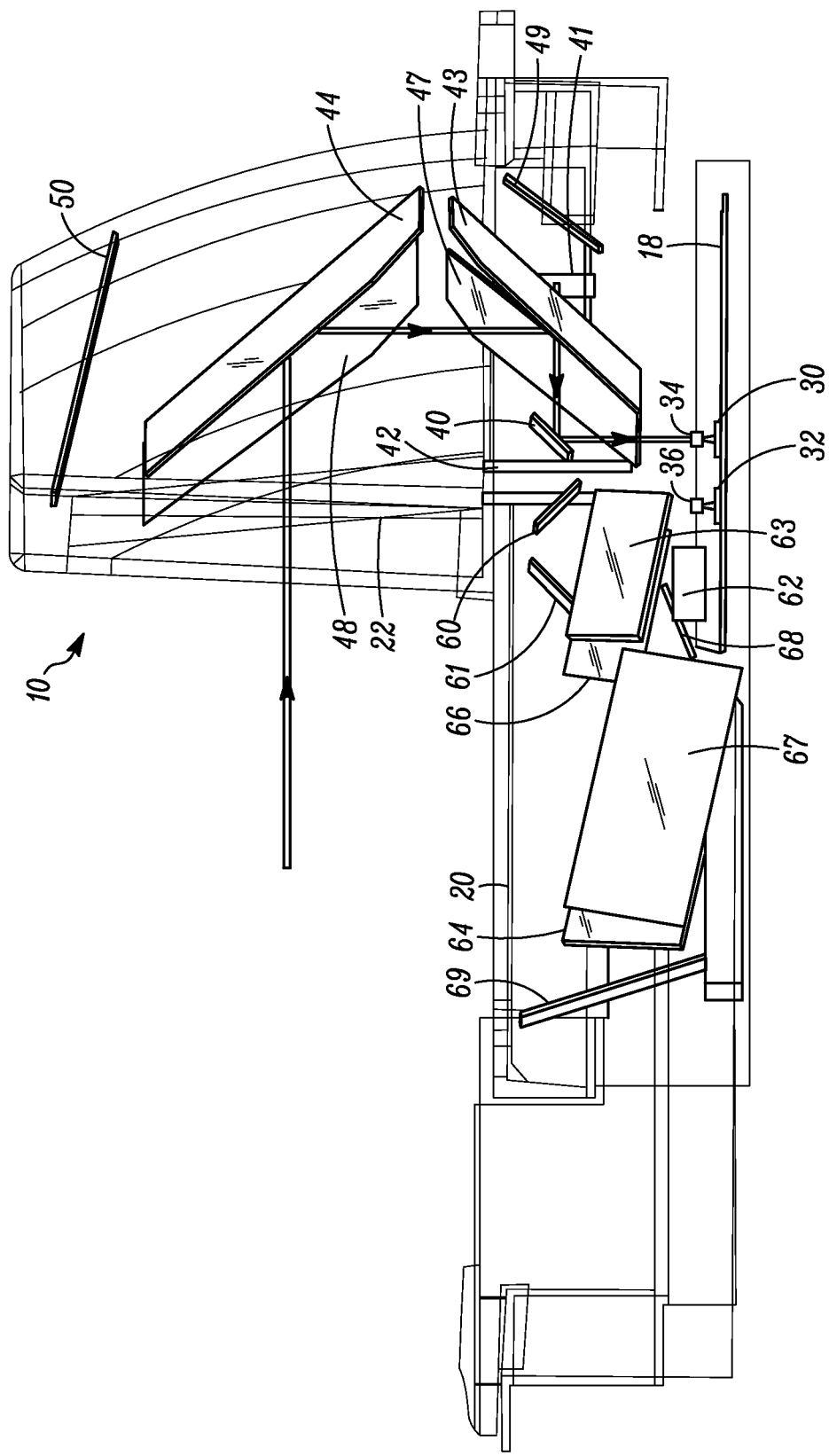
FIG. 4 is a side perspective, enlarged, view of the optical path of FIG. 3.

As best shown in FIGS. 3-4, a first solid-state imager 30 and a second solid-state imager 32 are commonly supported on a printed circuit board 18 within the housing. Each imager 30, 32 has a sensor array of sensors with a main field of view diagrammatically shown by speckles in the various views. As described below, the main field of view of the first imager 30 is directed out of the upright window 22; hence, the first imager 30 will be individually referred to as the vertical imager 30 for convenience. Similarly, the main field of view of the second imager 32 is directed out of the horizontal window 20; hence, the second imager 32 will be individually referred to as the horizontal imager 32 for convenience.

Each imager 30, 32 preferably comprises a two-dimensional, charge coupled device (CCD) array, or a complementary metal oxide semiconductor (CMOS) array, of sensors of megapixel size, e.g., 1280 pixels wide×960 pixels high. In a preferred embodiment, the main field of view of each imager 30, 32 measures about 15 degrees by 30 degrees. The arrays of both imagers 30, 32 extend along mutually perpendicular, row and column, directions. Thus, as shown in FIG. 2, each imager has a row axis and a column axis. Each imager 30, 32 includes an imaging lens assembly 34, 36 (see FIG. 4) for capturing return light from the indicia 14 and for projecting the captured return light onto the respective sensor array. Each imager 30, 32 may include, or be associated with, an illuminator for illuminating the indicia with illumination light from one or more illumination light sources, e.g., surface-mounted, light emitting diodes (LEDs). The LEDs may either be closely adjacent the respective sensor array, or remote therefrom.

A controller 24 (see FIG. 3) is a programmed microprocessor that is also mounted on the board 18 and is operative for controlling each illuminator to illuminate the indicia 14, for controlling each imager 30, 32 to operate at a frame rate of multiple frames per second to detect the illumination light returning from the indicia and captured by the imaging lens assemblies 34, 36 to produce electrical signals indicative of the indicia being read, and for processing the electrical signals to image the indicia 14, and to decode the indicia when the indicia is a symbol. Each illuminator is preferably only operative during an exposure time period. Each imager 30, 32 is preferably controlled to capture the return light from the indicia during different exposure time periods to avoid interference between the illuminators.

Each imager 30, 32 preferably has a global shutter so that the captured images will not be disturbed by motion of the indicia 14 relative to the window(s) during the exposure time period. A rolling or a mechanical shutter could also be employed. The indicia 14 can be presented or swiped at speeds up to around 100 inches per second across any part of either window. For an imager to be able to read an indicium that is moving rapidly, the indicium must be brightly illuminated by the illuminators so that a short exposure time can be used. Bright illumination light shining out of either window can be annoying or uncomfortable to the user, so the illumination light must not be directly viewable by the operator, or by a consumer standing nearby.

Figure 13:
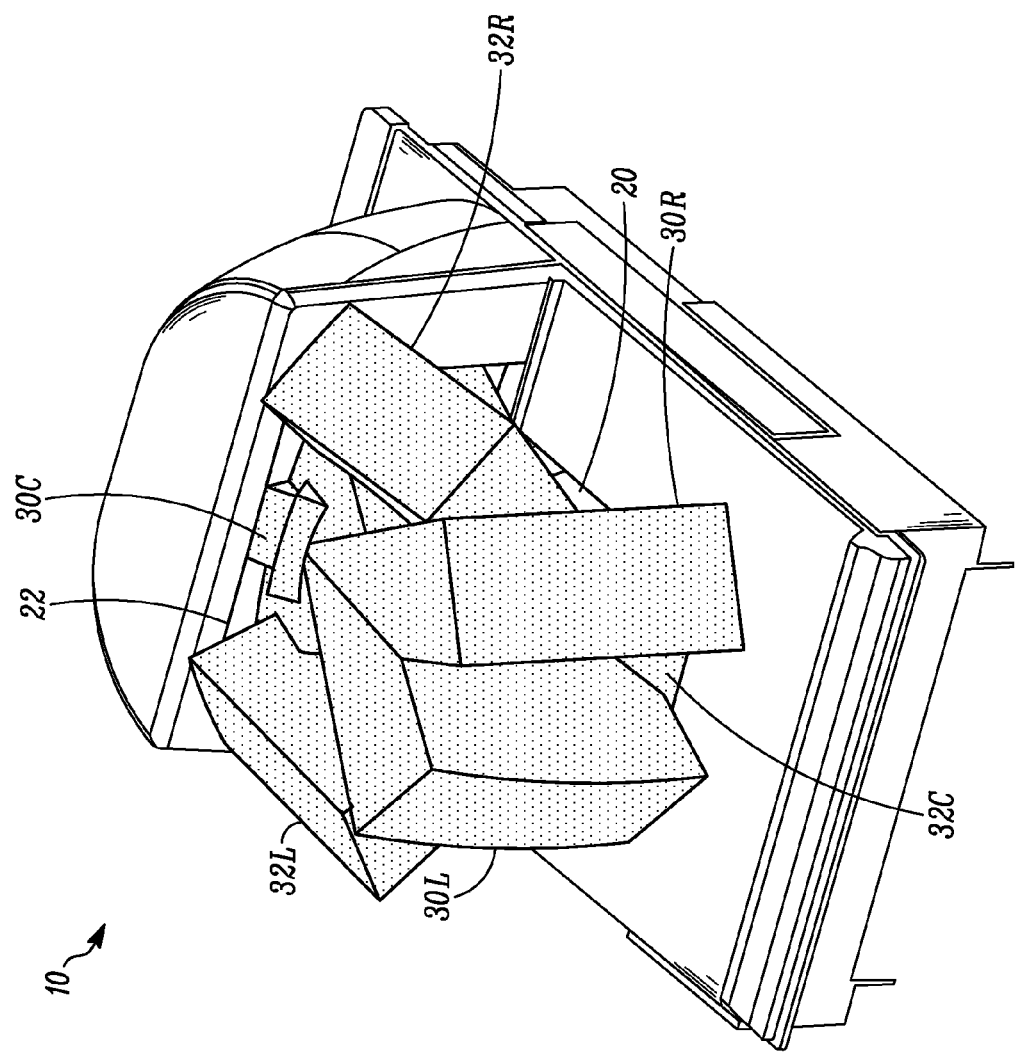
FIG. 13 is a perspective view of the workstation of FIG. 1 diagrammatically depicting all six subfields exteriorly of the windows.

An optical system is supported by the housing 16 and is operative for directing the captured return light along a first folded optical path from the upright window 22 to the vertical imager 30, and along a second folded optical path from the horizontal window 20 to the horizontal imager 32. As described in more detail below, the optical system is further operative for splitting the main field of view of the vertical imager 30 into a plurality of subfields of view, namely a center subfield 30C flanked by two outer, right and left, subfields 30R, 30L, and for splitting the field of view of the horizontal imager 32 into a plurality of subfields of view, again a center subfield 32C flanked by two outer, right and left, subfields 32R, 32L. These various subfields outside of the windows 20, 22 are shown in FIG. 13.

The optical system has a plurality of fold mirrors each positioned in each of the first and second optical paths to fold the captured return light in the subfields of view. As shown in FIGS. 3-4, a first plurality of fold mirrors 40, 41, 42, 43 and 44 are positioned along a first optical path part between the vertical imager 30 and the upright window 22 to fold the captured return light in the outer subfield 30L to successively reflect off mirrors 44, 43, 42, 41 and 40, in that order, prior to being focused by the imaging lens assembly 34 onto the vertical imager 30. In analogous manner, a second plurality of fold mirrors 40, 45, 46, 47 and 48 are positioned along a second optical path part between the vertical imager 30 and the upright window 22 to fold the captured return light in the outer subfield 30R to successively reflect off mirrors 48, 47, 46, 45 and 40, in that order, prior to being focused by the imaging lens assembly 34 onto the vertical imager 30. A third plurality of fold mirrors 40, 49 and 50 are positioned along a third optical path part between the vertical imager 30 and the upright window 22 to fold the captured return light in the center subfield 30C to successively reflect off mirrors 50, 49 and 40, in that order, prior to being focused by the imaging lens assembly 34 onto the vertical imager 30.

Figure 5:
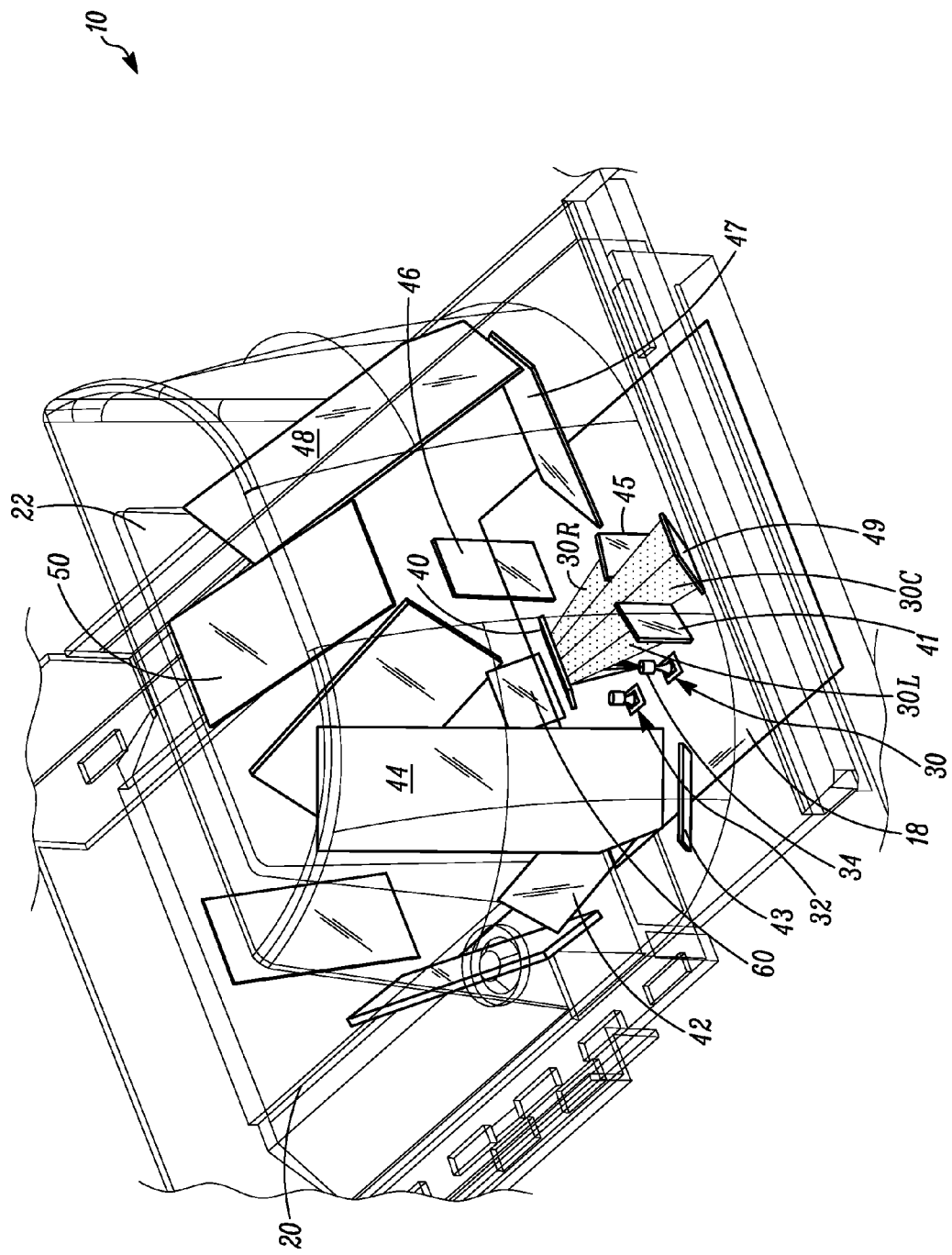
FIG. 5 is a rear perspective view of the optical system part of FIG. 3 depicting an optical splitter for splitting the field of view of the imager into a central subfield of view flanked by two outer subfields of view.
Figure 6:
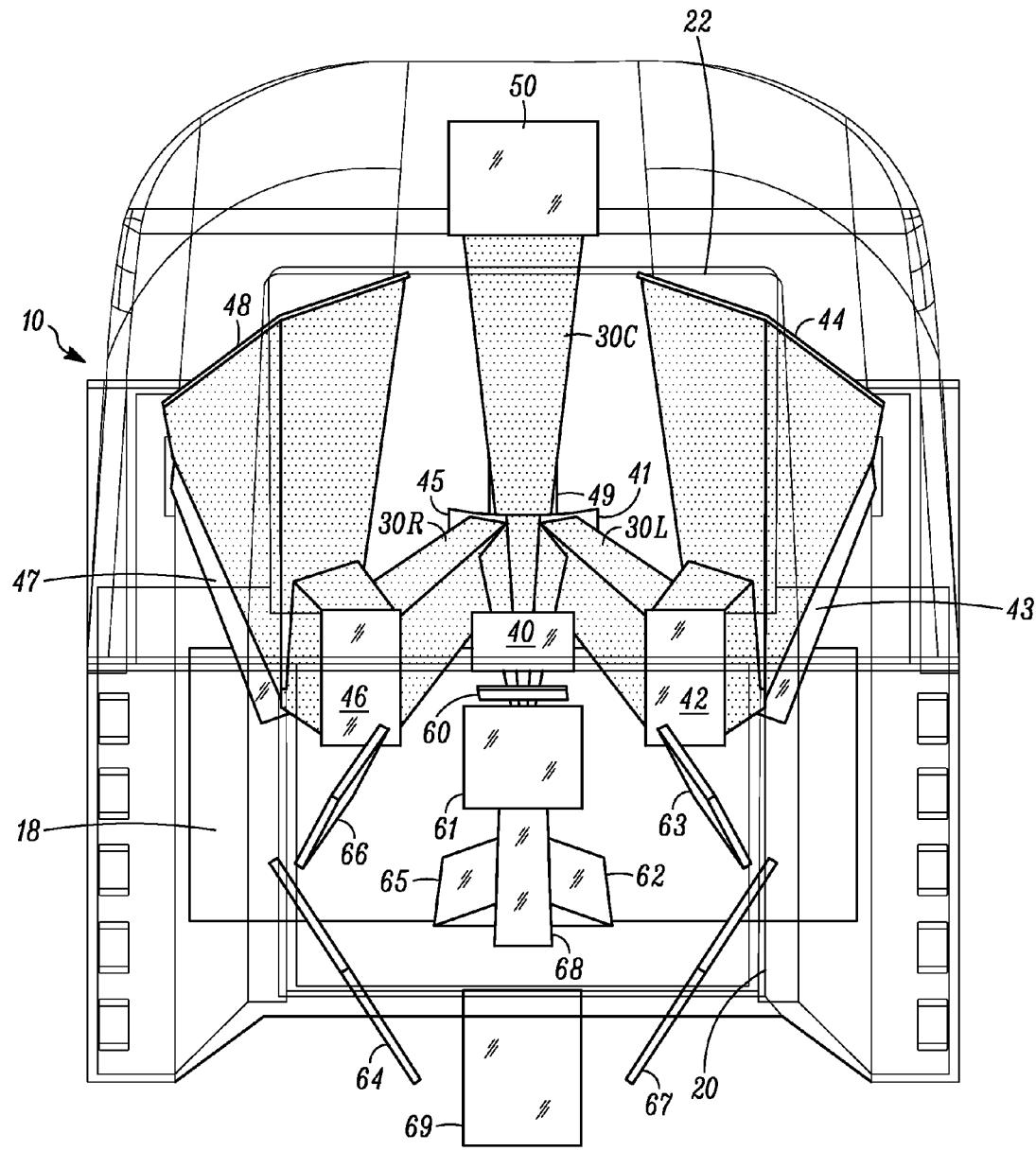
FIG. 6 is a top plan view of the optical system part of FIG. 3 diagrammatically depicting the subfields downstream of the optical splitter.
Figure 7:
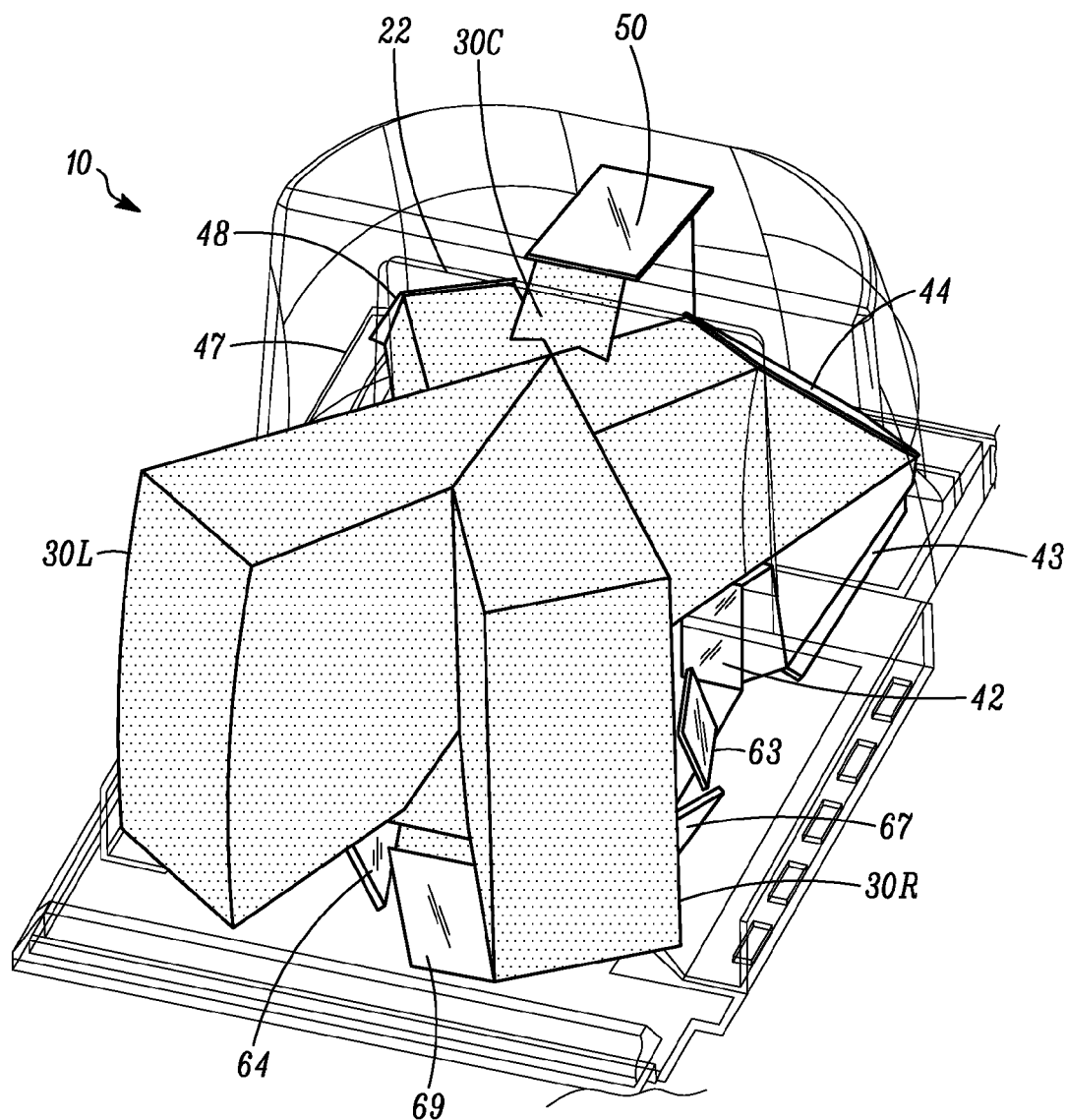
FIG. 7 is a perspective view of the optical system part of FIG. 3 diagrammatically depicting three subfields exteriorly of the upright window of the workstation of FIG. 1.

The aforementioned mirrors 41, 45 and 49, as best seen in FIG. 5, comprise a first optical splitter, wherein the mirror 49 splits a central part of the main field of view of the vertical imager 30 into the center subfield 30C, wherein the mirror 41 splits an outer part of the main field of view of the vertical imager 30 into the outer subfield 30L, and wherein the mirror 45 splits another outer part of the main field of view of the vertical imager 30 into the outer subfield 30R. FIG. 6 best depicts, as seen from above, the separate passage and folding of the outer subfield 30L between the mirrors 44, 43, 42, 41 and 40, as seen from above, and also depicts the separate passage and folding of the outer subfield 30R between the mirrors 48, 47, 46, 45 and 40. FIG. 7 best depicts the separate passage and folding of the outer subfield 30L through the upright window 22 and onto the mirror 44, and the separate passage and folding of the outer subfield 30R through the upright window 22 and onto the mirror 48.

The above discussion for FIGS. 3-7 dealt with the various fold mirrors of the optical system for folding and splitting the subfields 30C, 30L and 30R between the upright window 22 and the vertical imager 30. The following discussion of FIGS. 8-12 deals with additional fold mirrors of the optical system for folding and splitting additional subfields 32C, 32L and 32R between the horizontal window 20 and the horizontal imager 32.

Figure 8:
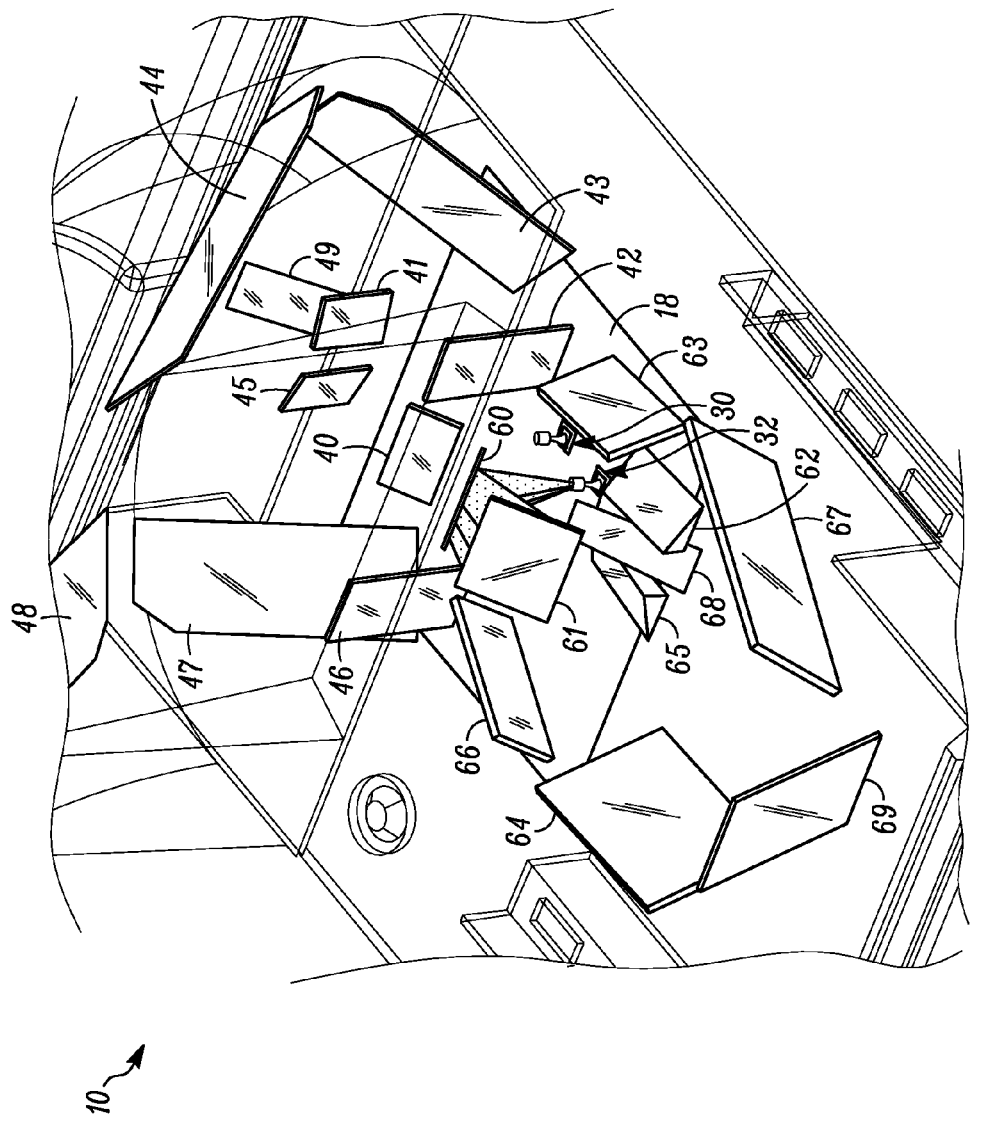
FIG. 8 is a broken-away, enlarged, perspective view of another part of the optical system in the workstation of FIG. 1 diagrammatically depicting part of another folded optical path of the field of view of another imager prior to reaching another optical splitter.
Figure 9:
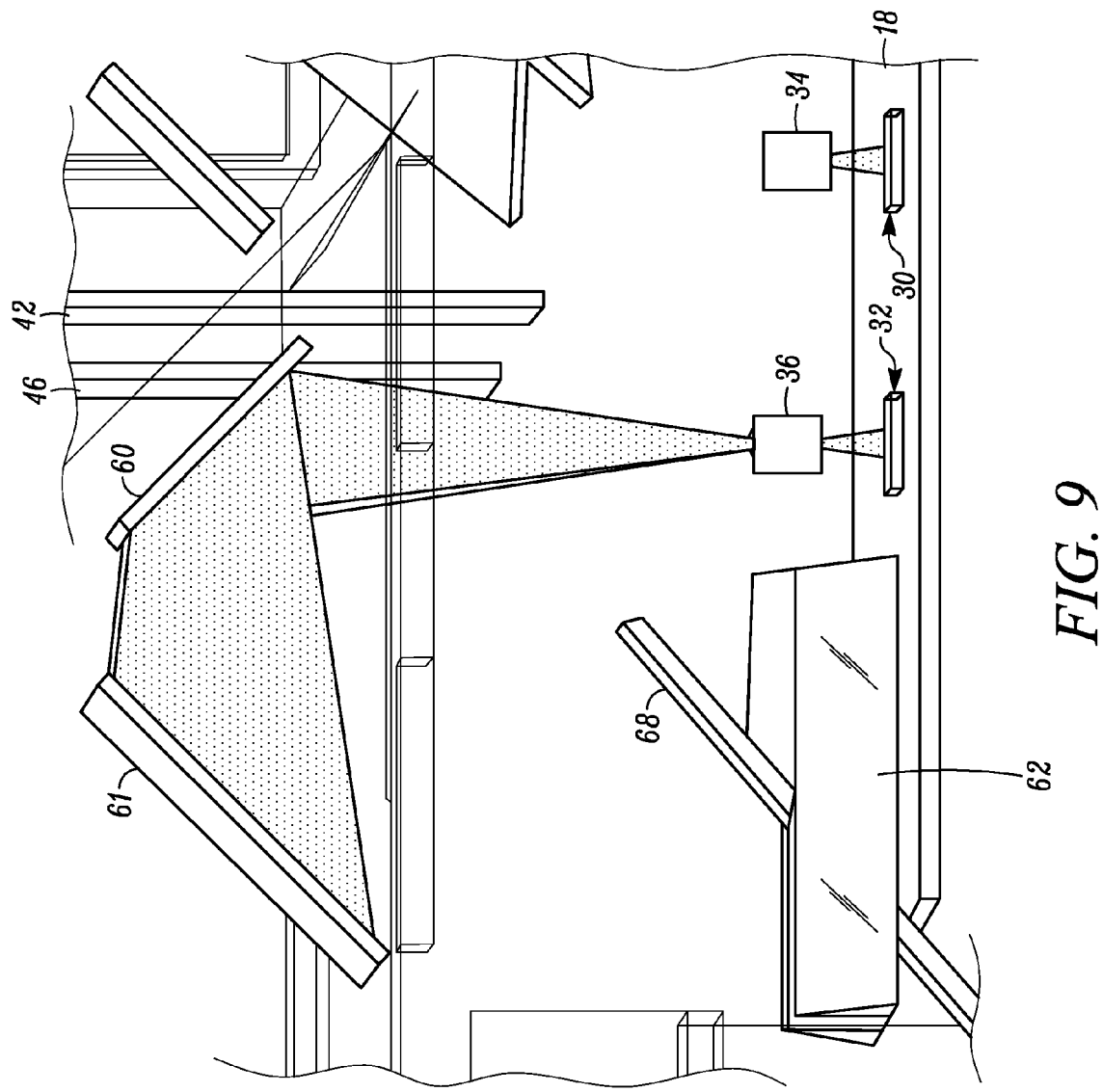
FIG. 9 is a side perspective, enlarged, view of the optical path part of FIG. 8.

Thus, the optical system, as best shown in FIGS. 8-9, includes a fourth plurality of fold mirrors 60, 61, 62, 63 and 64 that are positioned along a first optical path part between the horizontal imager 32 and the horizontal window 20 to fold the captured return light in the outer subfield 32R to successively reflect off mirrors 64, 63, 62, 61 and 60, in that order, prior to being focused by the imaging lens assembly 36 onto the horizontal imager 32. In analogous manner, a fifth plurality of fold mirrors 60, 61, 65, 66 and 67 are positioned along a second optical path part between the horizontal imager 32 and the horizontal window 20 to fold the captured return light in the outer subfield 32L to successively reflect off mirrors 67, 66, 65, 61 and 60, in that order, prior to being focused by the imaging lens assembly 36 onto the horizontal imager 32. A sixth plurality of fold mirrors 60, 61, 68 and 69 are positioned along a third optical path part between the horizontal imager 32 and the horizontal window 20 to fold the captured return light in the center subfield 32C to successively reflect off mirrors 69, 68, 61 and 60, in that order, prior to being focused by the imaging lens assembly 36 onto the horizontal imager 32.

Figure 10:
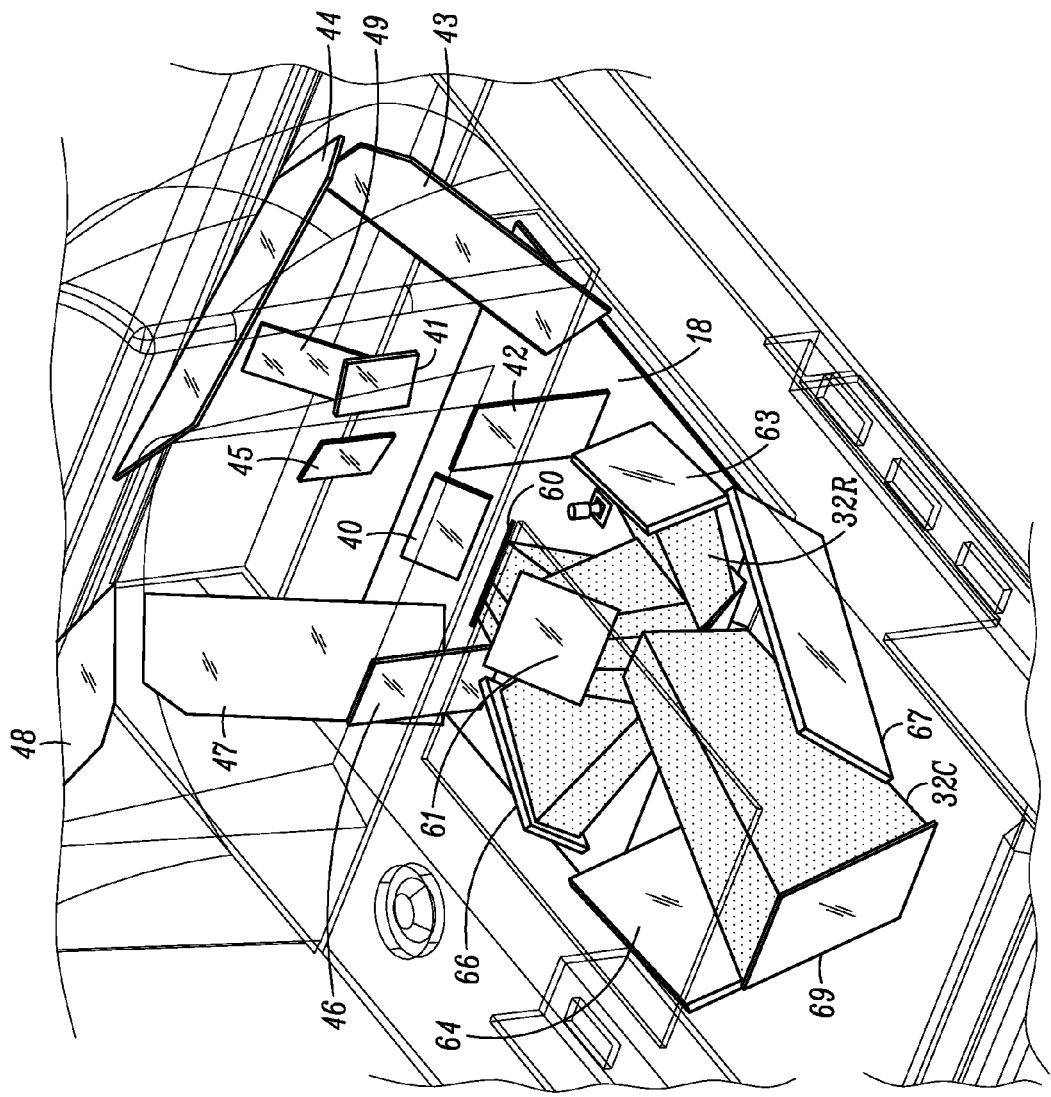
FIG. 10 is a perspective view diagrammatically depicting the subfields downstream of the optical splitter of FIG. 8.
Figure 11:
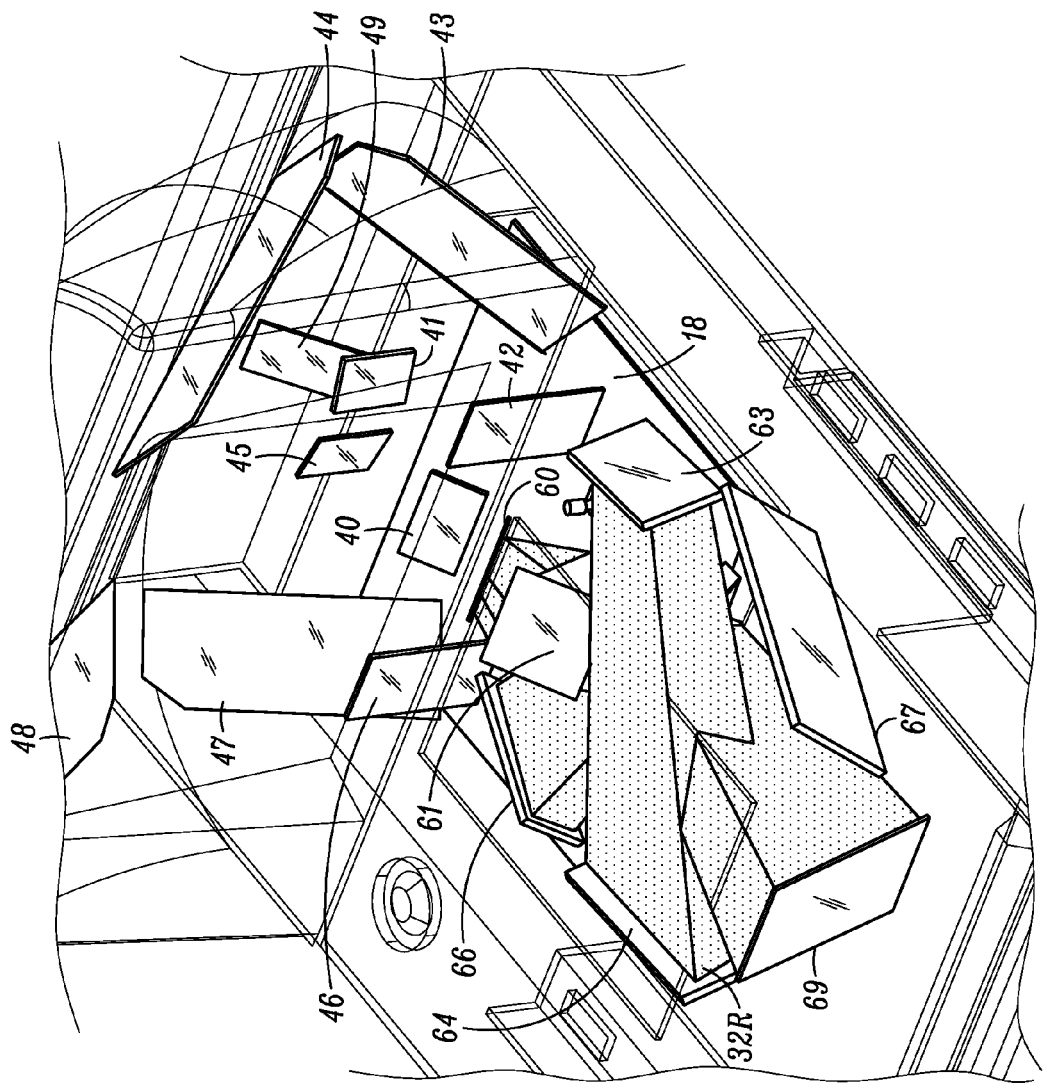
FIG. 11 is a perspective view diagrammatically depicting the subfields still further downstream of the optical splitter of FIG. 8.
Figure 12:
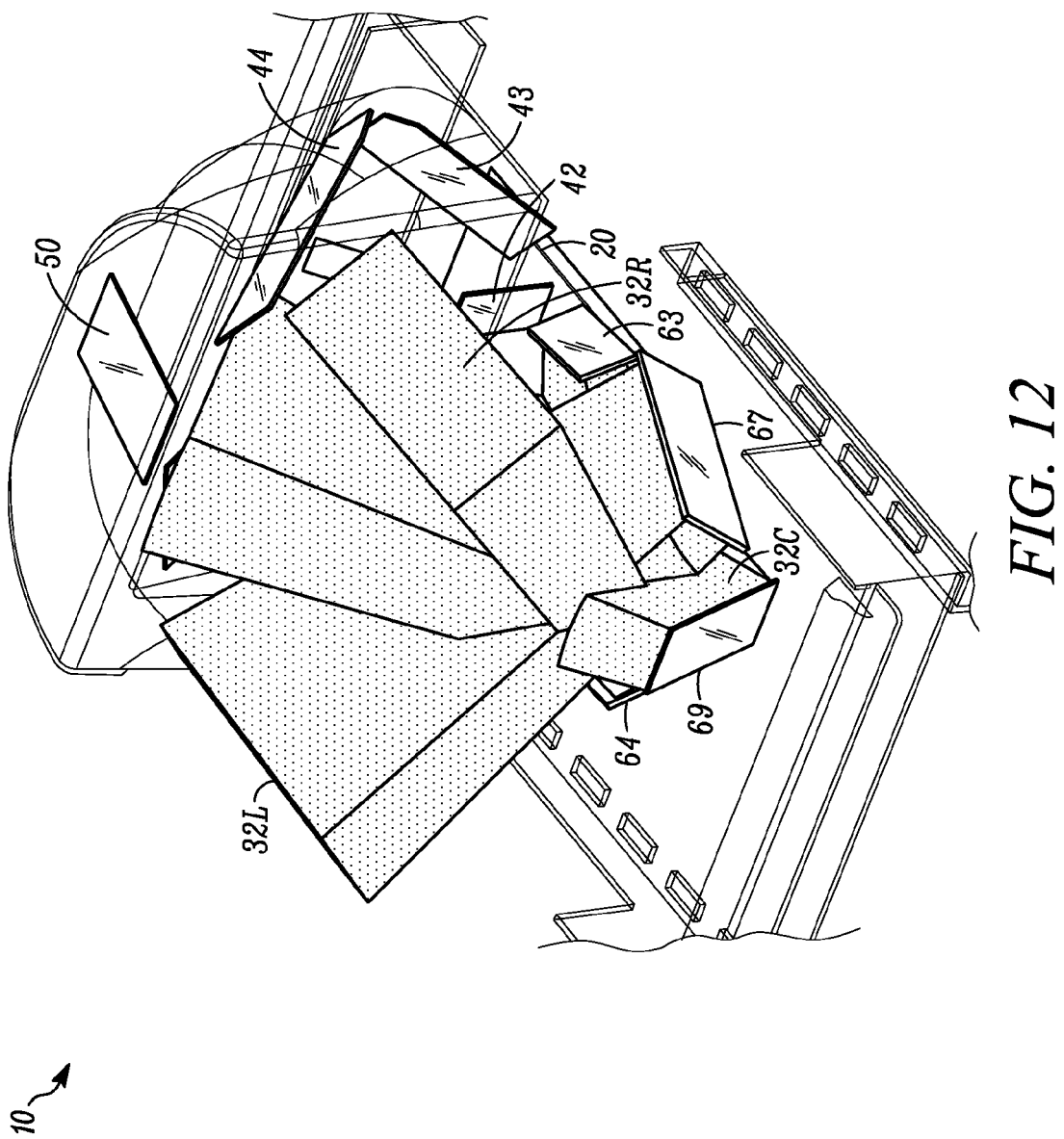
FIG. 12 is a perspective view of the other optical system part of FIG. 8 diagrammatically depicting three subfields exteriorly of the horizontal window of the workstation of FIG. 1.

The aforementioned mirrors 62, 65 and 68, as best seen in FIG. 8, comprise a second optical splitter, wherein the mirror 68 splits a central part of the main field of view of the horizontal imager 32 into the center subfield 32C, wherein the mirror 62 splits an outer part of the main field of view of the horizontal imager 32 into the outer subfield 32R, and wherein the mirror 65 splits another outer part of the main field of view of the horizontal imager 32 into the outer subfield 32L. FIG. 9 best depicts the folding of all three subfields between the mirrors 61 and 60 and the horizontal imager 32 away from the second optical splitter 62, 65 and 68. FIG. 10 best depicts the separate passage and folding of the outer subfield 32R between the mirrors 62 and 63, and also depicts the separate passage and folding of the outer subfield 32L between the mirrors 45 and 66, and also depicts the separate passage and folding of the central subfield 32C between the mirrors 68 and 69. FIG. 11 best depicts the separate passage and folding of the outer subfield 32R between the mirrors 63 and 64; in analogous manner, it will be understood that the outer subfield 32L passes between the mirrors 66 and 67 (not illustrated so as not to encumber the drawing). FIG. 12 best depicts the separate passage and folding of the outer subfield 32R through the horizontal window 20 and onto the mirror 64, and the separate passage and folding of the outer subfield 32L through the horizontal window 20 and onto the mirror 67, and the separate passage and folding of the central subfield 32C through the horizontal window 20 and onto the mirror 69.

Advantageously, only two imagers 30, 32 are needed to produce six subfields. These six subfields provide optimum visibility of indicia on various sides of a product being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users. If a user should present a product in an unusual way, however, such as by positioning the indicia opposite one of the windows, a subfield will still be positioned to read that indicia.

In accordance with this invention, at least one of the subfields is optically configured by the optical system, which includes the above-mentioned optical splitters, fold mirrors and the imaging lens assemblies 34, 36, to enable at least one of the imagers 30, 32 to capture return light from the indicia 14 along one of the array axes, no matter how the indicia 14 is arbitrarily oriented in the workstation 10, and at least another of the subfields is also optically configured by the optical system to enable at least one of the imagers 30, 32 to capture return light from the arbitrarily oriented indicia 14 along the other of the array axes. The controller 24 processes the captured return light in both the subfields to enable the reading of the arbitrarily oriented indicia 14 in the workstation 10 independently of the orientation of the indicia 14 relative to the array axes.

Figure 14:
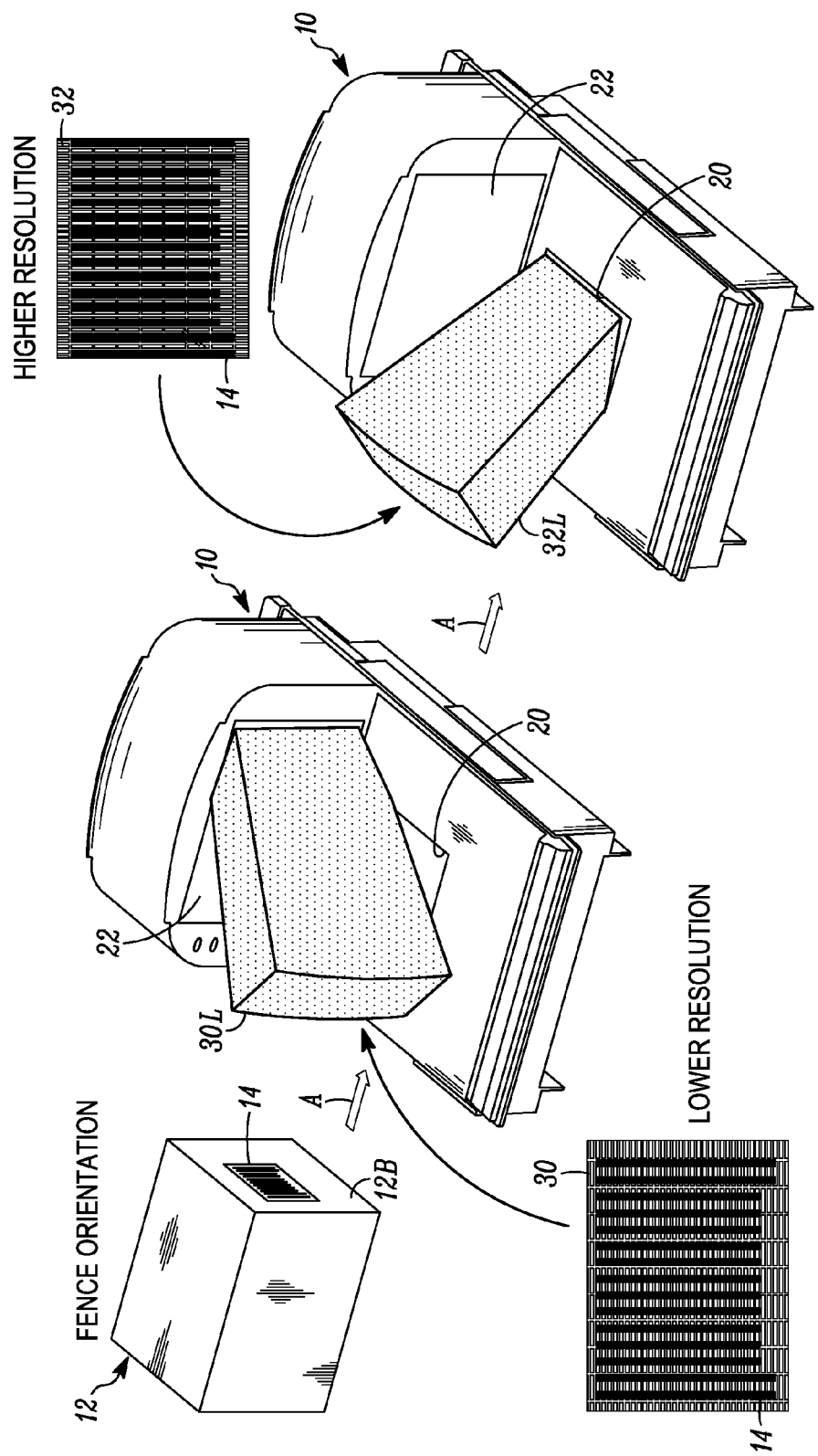
FIG. 14 is a set of successive views depicting different resolutions in two subfields passing through different windows in the workstation of FIG. 1 for reading a target symbol in a fence orientation.

Thus, as shown in the successive views of FIG. 14, the target indicia 14 is oriented in a fence orientation and is located on a right side 12B of the product 12, and is moved in the direction of the arrow A into the workstation 10, and into the subfield 30L passing through the upright window 22, and also into the subfield 32L passing through the horizontal window 20. As can be seen from the projected sensors of the imagers 30, 32, the subfield 32L of the imager 32 has a higher resolution than that of the subfield 30L of the imager 30. Hence, the more optimized subfield 32L will be the one used by the controller 24 to read the indicia 14.

Figure 15:
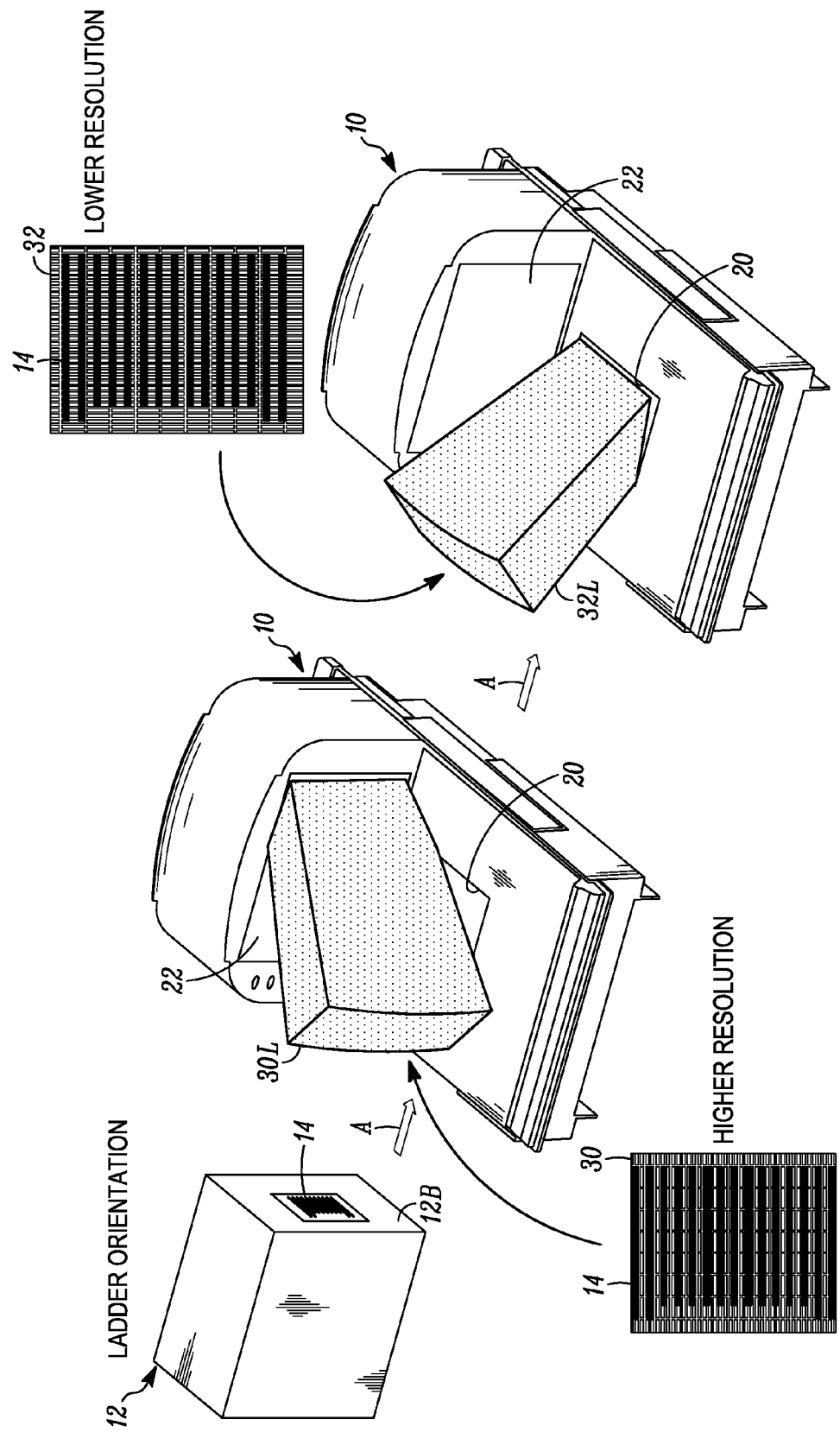
FIG. 15 is analogous to FIG. 14, but for a target symbol in a ladder orientation.

As shown in the successive views of FIG. 15, the target indicia 14 is oriented in a ladder orientation and is located on the right side 12B of the product 12, and is moved in the direction of the arrow A into the workstation 10, and into the subfield 30L passing through the upright window 22, and also into the subfield 32L passing through the horizontal window 20. As can be seen from the projected sensors of the imagers 30, 32, the subfield 30L of the imager 30 has a higher resolution than that of the subfield 32L of the imager 32. Hence, the more optimized subfield 30L will be the one used by the controller 24 to read the indicia 14.

Figure 16:
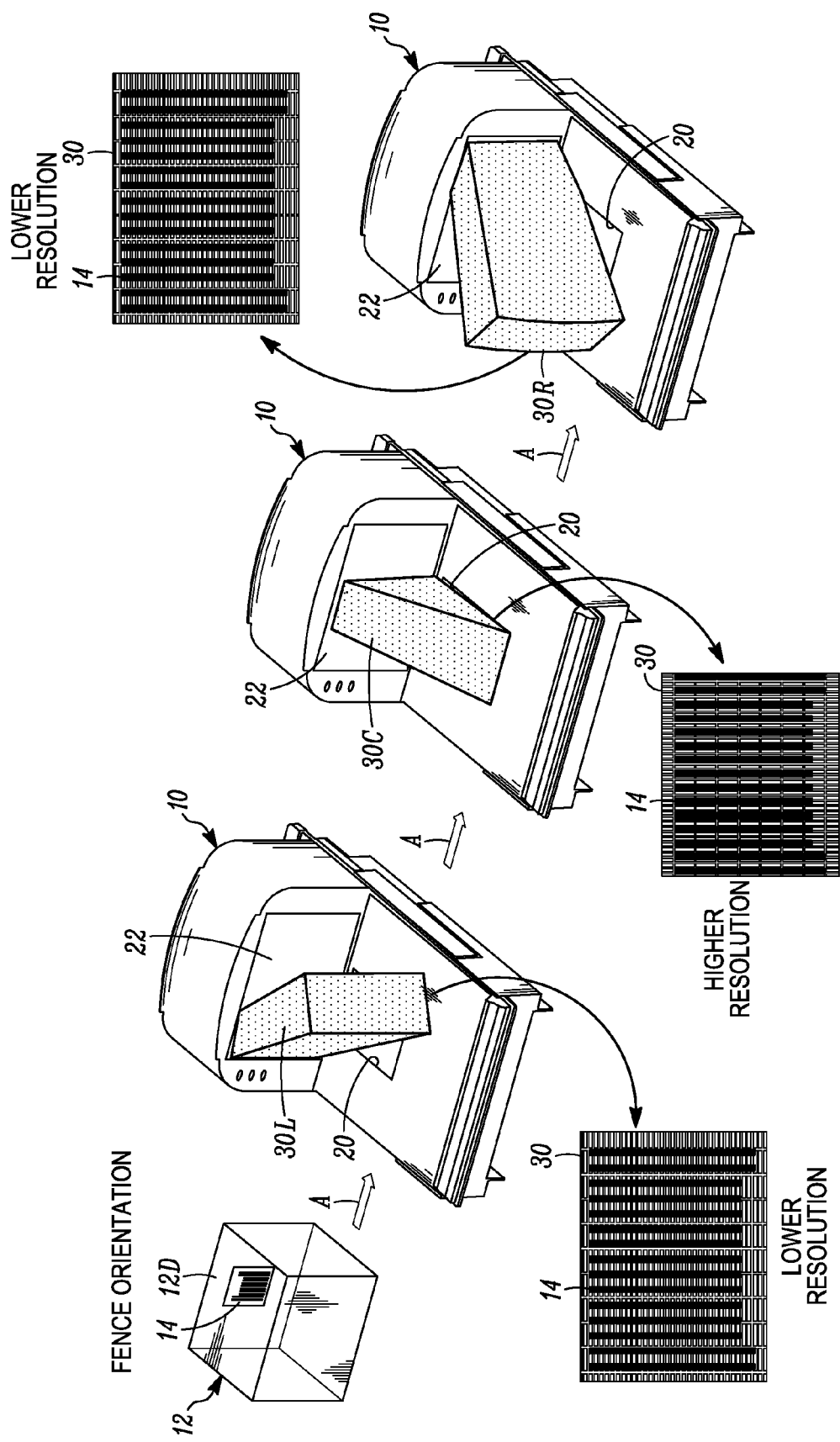
FIG. 16 is a set of successive views depicting different resolutions in three subfields passing through an upright window in the workstation of FIG. 1 for reading a target symbol in a fence orientation.

As illustrated so far, two subfields passing through two separate windows are used to read the arbitrarily oriented indicia 14. Turning now to the successive views of FIGS. 16-17, three subfields passing through the same window are used to read the arbitrarily oriented indicia 14. Thus, as shown in FIG. 16, the target indicia 14 is oriented in a fence orientation and is located on a rear side 12D of the product 12, and is moved in the direction of the arrow A into the workstation 10, and into the subfield 30L passing through the upright window 22, and also into the subfield 30C passing through the upright window 22, and also into the subfield 30R passing through the upright window 22. As can be seen from the projected sensors of the imager 30, the subfield 30C of the imager 30 has a higher resolution than that of either the subfield 30L or the subfield 30R of the imager 30. Hence, the more optimized subfield 30C will be the one used by the controller 24 to read the indicia 14.

Figure 17:
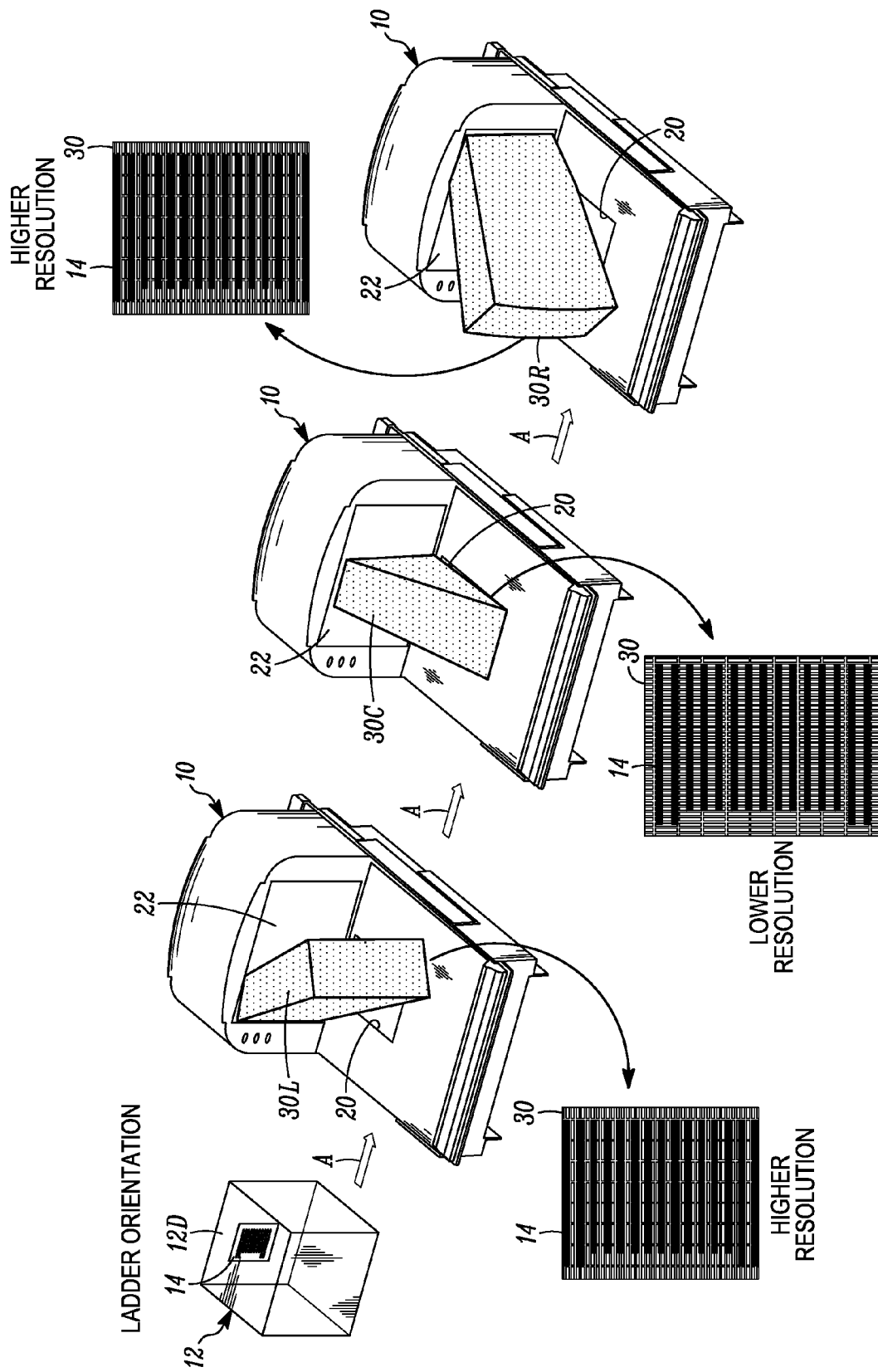
FIG. 17 is analogous to FIG. 16, but for a target symbol in a ladder orientation.

As shown in FIG. 17, the target indicia 14 is oriented in a ladder orientation and is located on the rear side 12D of the product 12, and is moved in the direction of the arrow A into the workstation 10, and into the subfield 30L passing through the upright window 22, and also into the subfield 30C passing through the upright window 22, and also into the subfield 30R passing through the upright window 22. As can be seen from the projected sensors of the imager 30, both the subfields 30L, 30R of the imager 30 have a higher resolution than that of the subfield 30C of the imager 30. Hence, the more optimized subfield 30L and/or 30R will be used by the controller 24 to read the indicia 14.

Figure 18:
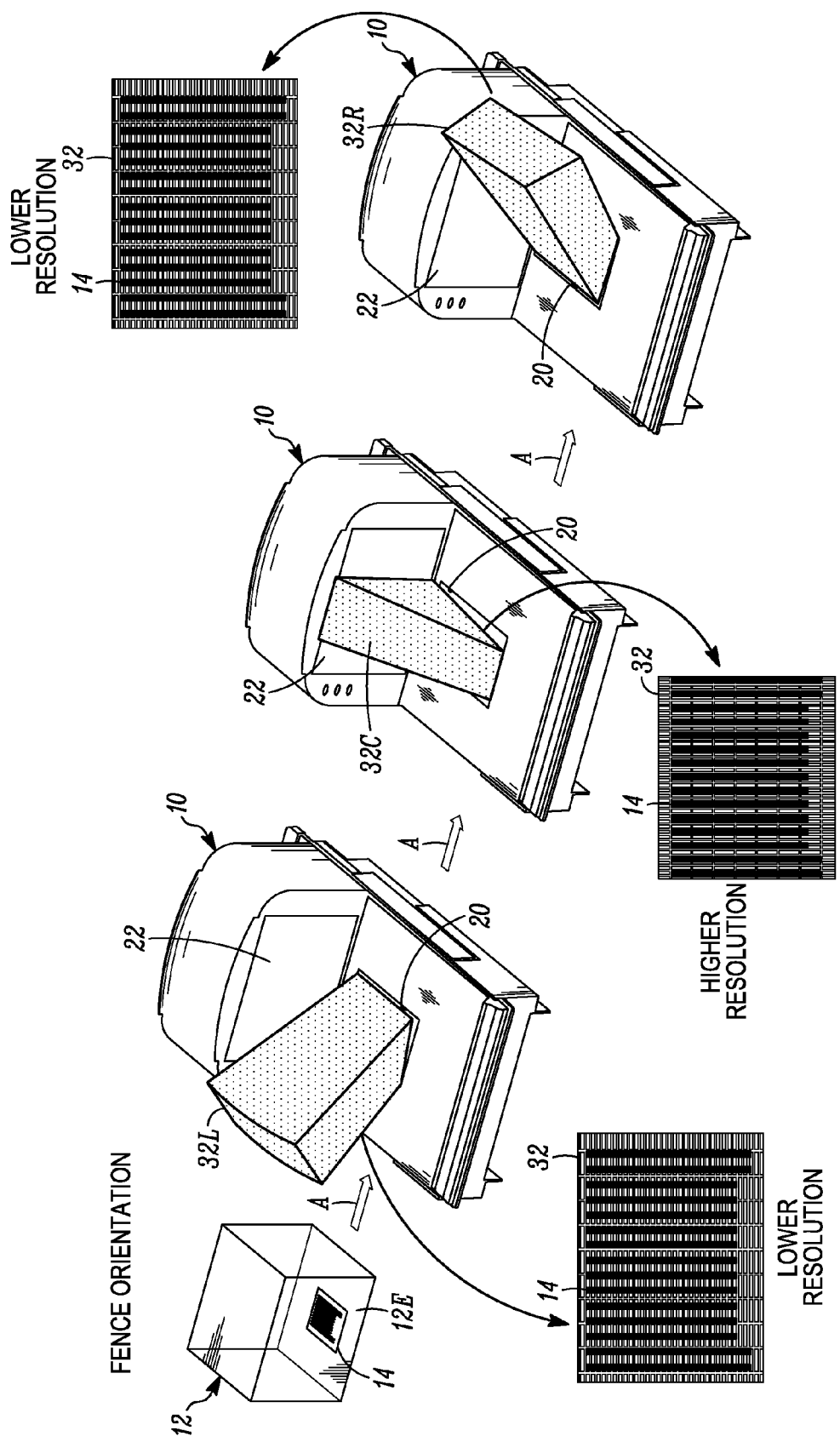
FIG. 18 is a set of successive views depicting different resolutions in three subfields passing through a horizontal window in the workstation of FIG. 1 for reading a target symbol in a fence orientation.

As illustrated so far, three subfields passing through the same upright window 22 are used to read the arbitrarily oriented indicia 14. Turning now to the successive views of FIGS. 18-19, three subfields passing through the same horizontal window are used to read the arbitrarily oriented indicia 14. Thus, as shown in FIG. 18, the target indicia 14 is oriented in a fence orientation and is located on a bottom side 12E of the product 12, and is moved in the direction of the arrow A into the workstation 10, and into the subfield 32L passing through the horizontal window 20, and also into the subfield 32C passing through the horizontal window 20, and also into the subfield 32R passing through the horizontal window 20. As can be seen from the projected sensors of the imager 32, the subfield 32C of the imager 30 has a higher resolution than that of either the subfield 32L or the subfield 32R of the imager 32. Hence, the more optimized subfield 32C will be the one used by the controller 24 to read the indicia 14.

Figure 19:
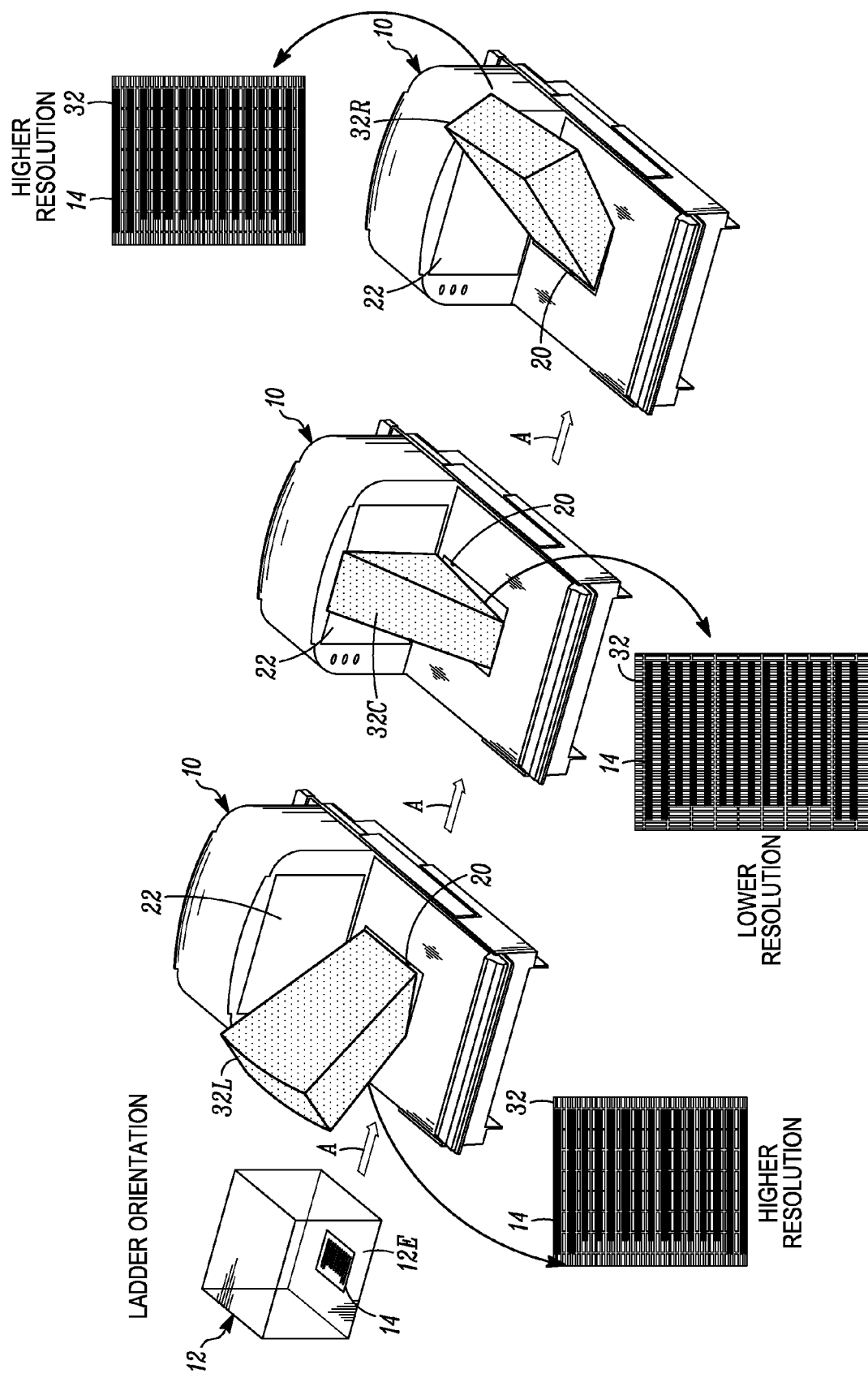
FIG. 19 is analogous to FIG. 18, but for a target symbol in a ladder orientation.

As shown in FIG. 19, the target indicia 14 is oriented in a ladder orientation and is located on the bottom side 12E of the product 12, and is moved in the direction of the arrow A into the workstation 10, and into the subfield 32L passing through the horizontal window 20, and also into the subfield 32C passing through the horizontal window 20, and also into the subfield 32R passing through the horizontal window 20. As can be seen from the projected sensors of the imager 32, both the subfields 32L, 32R of the imager 32 have a higher resolution than that of the subfield 32C of the imager 32. Hence, the more optimized subfield 32L and/or 32R will be used by the controller 24 to read the indicia 14.

Since the embodiment of FIGS. 14-15 uses two windows, it is best suited for use in a bi-optical scanning workstation. Since the embodiment of FIGS. 16-17 uses the upright window, it is best suited for use in a vertical slot scanning workstation. Since the embodiment of FIGS. 18-19 uses the horizontal window, it is best suited for use in a flat-bed scanning workstation.

Optical configuration of each subfield is advantageously achieved by changing the focal length of focusing lenses in the imaging lens assemblies 34, 36, and/or by changing the optical folded path lengths introduced by the fold mirrors, and/or by changing the imagers. The lenses in the imaging lens assemblies 34, 36 are rotationally symmetrical without anamorphic properties.

In use, an operator, such as a person working at a supermarket checkout counter, or a customer in a self checkout stand, processes the product 12 bearing the UPC target symbol 14 thereon, past the windows 20, 22 by swiping the product 12 across a respective window, or by presenting the product 12 at the respective window. The target symbol 14 may oriented in any orientation, and be located on any of the top, bottom, right, left, front and rear, sides of the product 12. At least one, and preferably two, of the subfields 30, 32 passing through one or more windows 20, 22 will capture the illumination light reflected, scattered, or otherwise returning from the target symbol 14. If the target symbol 14 is oriented in one orientation, e.g., the above-described ladder orientation, then the subfield optimized to read a target symbol 14 in that orientation is used. If the target symbol 14 is oriented in another orientation, e.g., the above-described fence orientation, then the subfield optimized to read a target symbol 14 in that other orientation is used. If the target symbol 14 is oriented in the above-described tilted orientation, then two or more subfields can be used.

In accordance with another feature of this invention, a method of electro-optically reading targets arbitrarily oriented in a workstation during reading, is performed by supporting a window on a housing, capturing return light from the targets over a main field of view of a solid-state imager having an array of sensors arranged along mutually perpendicular array axes, splitting the main field of view into a plurality of subfields of view that extend through the window to an arbitrarily oriented target in the workstation, optically configuring one of the subfields to enable the imager to capture return light from the arbitrarily oriented target along one of the array axes, optically configuring another of the subfields to enable the imager to capture return light from the arbitrarily oriented target along the other of the array axes; and controlling the imager and processing the captured return light in both the one and the other subfields to enable the reading of the arbitrarily oriented target independently of target orientation in the workstation relative to the array axes.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A point-of-transaction workstation for electro-optically reading targets arbitrarily oriented in the workstation during reading, comprising:
   a housing;
   a window supported by the housing;
   a solid-state imager supported by the housing, and operative for capturing return light from the targets over a main field of view, the imager having an array of sensors arranged along mutually perpendicular array axes;
   an optical system supported by the housing and operative for splitting the main field of view into a plurality of subfields of view that extend through the window to an arbitrarily oriented target in the workstation, and for optically configuring one of the subfields to enable the imager to capture return light from the arbitrarily oriented target with resolution optimized along one of the array axes, and for optically configuring another of the subfields to enable the imager to capture return light from the arbitrarily oriented target with resolution optimized along the other of the array axes; and
   a controller for controlling the imager and for processing the captured return light in both the one and the other subfields to enable the reading of the arbitrarily oriented target in the workstation independently of target orientation relative to the array axes.

2. The workstation of claim 1, wherein the optical system configures the one and the other subfields in which the controller processes the captured return light to pass through the window along different intersecting directions.

3. The workstation of claim 1, wherein the optical system configures at least one of the subfields to have an optimal resolution along at least one of the array axes.

4. The workstation of claim 1, wherein the window is located in an upright plane; and further comprising another window supported by the housing and located in a generally horizontal plane that intersects the upright plane, and another solid-state imager supported by the housing and having another array of light sensors that have another main field of view and that are arranged along mutually perpendicular array axes.

5. The workstation of claim 4, wherein the optical system includes a pair of optical splitters for splitting the main fields of view into a first plurality of the subfields that pass through one of the windows, and into a second plurality of the subfields that pass through the other of the windows.

6. The workstation of claim 4, wherein the optical system configures the one and the other subfields in which the controller processes the captured return light to pass through one of the windows.

7. The workstation of claim 4, wherein the optical system configures the one of the subfields in which the controller processes the captured return light to pass through one of the windows, and configures the other of the subfields in which the controller processes the captured return light to pass through the other of the windows.

8. The workstation of claim 4, wherein the optical system includes, for each imager, an imaging lens assembly of rotationally symmetrical optics without anamorphic properties.

9. A point-of-transaction workstation for electro-optically reading targets arbitrarily oriented in the workstation during reading, comprising:
   a housing;
   a window supported by the housing;
   a solid-state imager supported by the housing, and operative for capturing return light from the targets over a main field of view, the imager having an array of sensors arranged along mutually perpendicular array axes;
   an optical system supported by the housing and operative for splitting the main field of view into a plurality of subfields of view that extend through the window to an arbitrarily oriented target in the workstation, and for optically configuring one of the subfields with an optimal resolution along one of the array axes to enable the imager to capture return light from the arbitrarily oriented target, and for optically configuring another of the subfields with an optimal resolution along the other of the array axes to enable the imager to capture return light from the arbitrarily oriented target; and
   a controller for controlling the imager and for processing the captured return light in both the one and the other subfields to enable the reading of the arbitrarily oriented target in the workstation independently of target orientation relative to the array axes.

10. A method of electro-optically reading targets arbitrarily oriented in a workstation during reading, comprising:
   supporting a window on a housing;
   capturing return light from the targets over a main field of view of a solid-state imager having an array of sensors arranged along mutually perpendicular array axes;
   splitting the main field of view into a plurality of subfields of view that extend through the window to an arbitrarily oriented target in the workstation;
   optically configuring one of the subfields to enable the imager to capture return light from the arbitrarily oriented target with resolution optimized along one of the array axes;
   optically configuring another of the subfields to enable the imager to capture return light from the arbitrarily oriented target with resolution optimized along the other of the array axes; and
   controlling the imager and processing the captured return light in both the one and the other subfields to enable the reading of the arbitrarily oriented target independently of target orientation in the workstation relative to the array axes.

11. The method of claim 10, and directing the one and the other subfields to pass through the window along different intersecting directions.

12. The method of claim 10, wherein the configuring is performed by configuring at least one of the subfields to have an optimal resolution along at least one of the array axes.

13. The method of claim 10, and supporting the window in an upright plane; and supporting another window on the housing in a generally horizontal plane that intersects the upright plane, and capturing return light from the targets over another main field of view with another solid-state imager having another array of light sensors arranged along mutually perpendicular array axes.

14. The method of claim 13, wherein the splitting is performed by splitting the main fields of view into a first plurality of the subfields that pass through one of the windows, and into a second plurality of the subfields that pass through the other of the windows.

15. The method of claim 13, and directing the one and the other subfields to pass through one of the windows.

16. The method of claim 13, and directing the one subfield to pass through one of the windows, and directing the other subfield to pass through the other of the windows.

17. The method of claim 13, wherein the configuring for each imager is performed by rotationally symmetrical optics without anamorphic properties.

\* \* \* \* \*